(12) United States Patent
Ezawa (10) Patent No.: US 7,042,502 B1
(45) Date of Patent: May 9, 2006

(54) ELECTRONIC CAMERA ACHIEVING HIGHER FRAME SPEED

(75) Inventor: Akira Ezawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/361,312

(22) Filed: Jul. 27, 1999

(30) Foreign Application Priority Data

Jul. 28, 1998  (JP)  ................................. 10-213207

(51) Int. Cl.
*G03B 19/12* (2006.01)
*H04N 5/228* (2006.01)
*H04N 5/225* (2006.01)

(52) U.S. Cl. .................... 348/222.1; 348/341; 396/358

(58) Field of Classification Search ................ 382/299; 348/230.1, 221.1, 222.1, 296, 341; 396/385, 396/354, 355, 357, 358
See application file for complete search history.

(56) References Cited

U.S. PATENT DOCUMENTS

| | | | | |
|---|---|---|---|---|
| 4,553,170 A | * | 11/1985 | Aoki et al. ................. | 348/341 |
| 4,974,003 A | * | 11/1990 | Ohnuki et al. ................. | 396/89 |
| 5,025,276 A | * | 6/1991 | Kitazawa et al. ........... | 396/443 |
| 5,459,511 A | * | 10/1995 | Uehara et al. .............. | 348/335 |
| 5,877,808 A | * | 3/1999 | Iizuka ........................ | 348/311 |
| 6,243,136 B1 | * | 6/2001 | Sasaki ........................ | 348/362 |
| 6,292,220 B1 | * | 9/2001 | Ogawa et al. .............. | 348/312 |
| 6,486,503 B1 | * | 11/2002 | Fossum ...................... | 257/215 |
| 6,522,357 B1 | * | 2/2003 | Beiley et al. ................ | 348/296 |

FOREIGN PATENT DOCUMENTS

| JP | A-6-54252 | 2/1994 |
|---|---|---|
| JP | A-7-135589 | 5/1995 |

\* cited by examiner

*Primary Examiner*—Thai Tran
*Assistant Examiner*—John M. Villecco
(74) *Attorney, Agent, or Firm*—Oliff & Berridge, PLC (57) ABSTRACT

An electronic camera includes: an image-capturing device that stores a signal electrical charge achieved by performing photoelectric conversion on a subject image projected on a photosensitive surface and reads out the signal electrical charge to generate an image signal; and a photographing preparation device that executes photographing preparations for photoelectric conversion performed at the image-capturing device. And the photographic preparation device executes at least some of the photographing preparations for photographing a next frame during an electrical charge read period at the image-capturing device.

17 Claims, 11 Drawing Sheets

ELECTRONIC CAMERA ACHIEVING HIGHER FRAME SPEED

INCORPORATION BY REFERENCE

The disclosure of the following priority application is herein incorporated by reference:

Japanese Patent Application No. 10-213207 filed Jul. 28, 1998.

BACKGROUND OF THE INVENTION

1. Field of the Invention

The present invention relates to an electronic camera. To be more specific, it relates to an electronic camera which is capable of photographing a higher number of frames per unit time (hereafter referred to as the "frame speed").

2. Description of the Related Art

Figure 11:
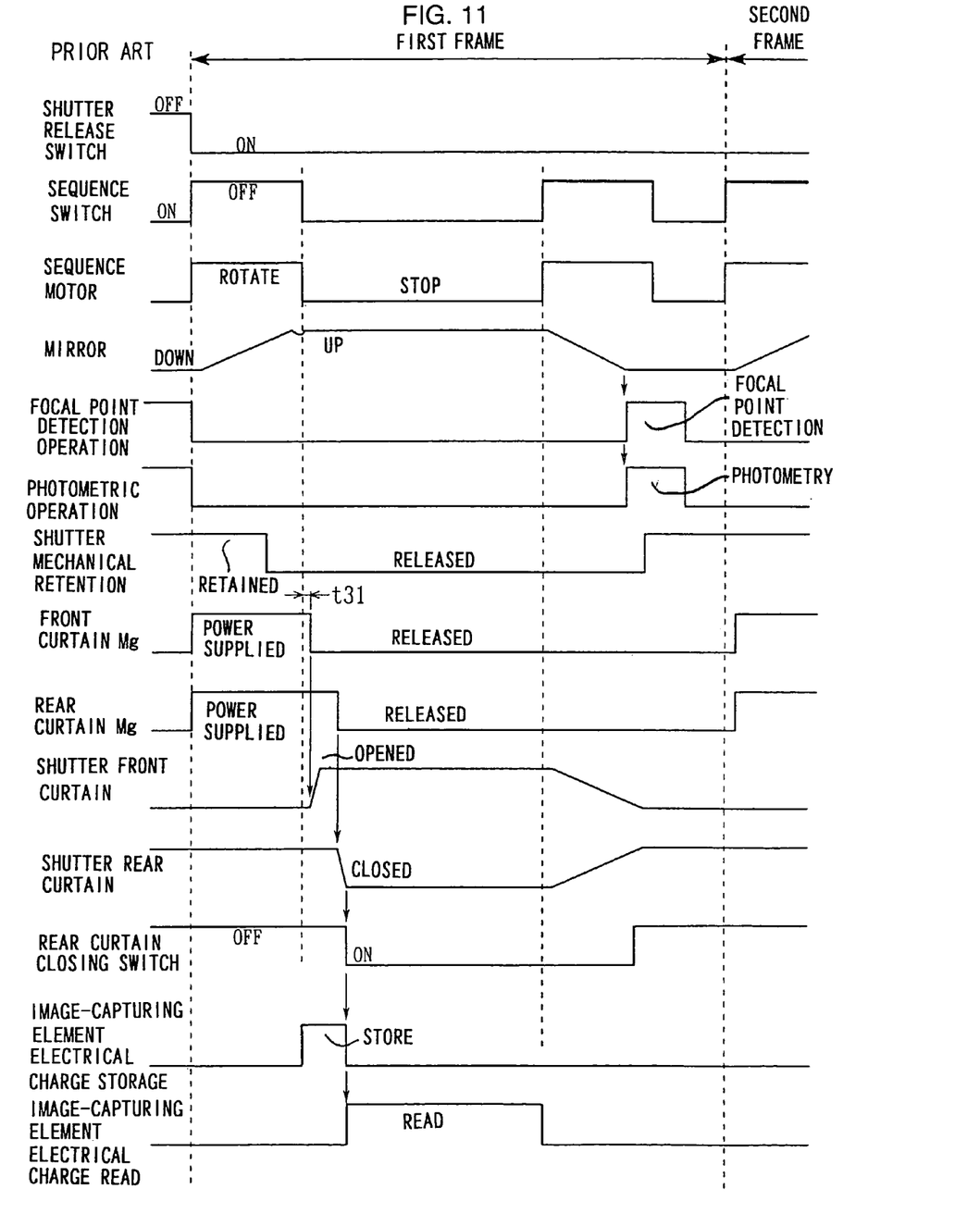
FIG. 11 shows the sequence of operations during continuous shooting in the prior art electronic camera.

There are single lens reflex type electronic cameras in the known art that separate the light flux from the photographing optical system to a viewfinder-side light flux and an image-capturing element-side light flux via a quick-return mirror or the like. FIG. 11 shows the sequence of operations performed in this type of electronic camera. In FIG. 11, when the shutter release switch at the electronic camera is fully pressed, the internal sequence motor starts to rotate in a state in which power is supplied to the front curtain magnet and the rear curtain magnet of the shutter.

This rotation of the sequence motor causes the quick-return mirror to swing upward and the mechanical retention of the shutter to be released. At this point, the front curtain and the rear curtain at the shutter are held in a retained state respectively by the front curtain magnet and the rear curtain magnet mentioned earlier.

When the sequence motor has rotated by a specific amount and the operation described above is completed, the sequence switch shifts to an ON state and the sequence motor is stopped temporarily. In synchronization with the shift of the sequence switch to the ON state, the image-capturing element discharges unnecessary electrical charge on the photosensitive surface and starts electrical charge storage. However, since the shutter is closed at this point, no substantial signal electrical charge storage is achieved.

After rebounding to some extent at the top of its upswing, the quick-return mirror stops. After allowing a specific length of time (t31 in the figure) to elapse to allow the rebounding to settle, power supply to the front curtain magnet is cut off and the front curtain at the shutter starts its run. When a length of time corresponding to a value set for the exposure time has elapsed after the front curtain starts its run, power supply to the rear curtain magnet is cut off and the rear curtain at the shutter starts its run.

With the two curtains caused to run one after the other in this manner, the photosensitive surface of the image-capturing element is exposed over the specific length of exposure time. When the rear curtain completes its run, the rear curtain closing switch shifts to an ON state. At the image-capturing element, a read of the signal electrical charge starts in synchronization with this shift of the rear curtain closing switch to the ON state.

After the read operation of the signal electrical charge is completed, the sequence motor starts to rotate again. This rotation of the sequence motor allows the mechanical operations (mirror down, shutter charge) to be executed in preparations for photographing of the next frame. When the mirror moves down, the path through which the subject light advances is changed, and the subject light is guided to the focal point detection block and the photometric unit of the electronic camera.

As the path of the subject light is changed in this manner, the focal point detection block and the photometric unit start measuring operations (focal point detection operation, photometry operation) in preparations for photographing of the next frame.

By repeating the sequence of operations while the shutter release switch is fully pressed down, continuous shooting is performed. The following details are known in the prior art as technologies that achieve higher frame speed in such continuous shooting.

(1) Japanese Laid-Open Patent Publication No. H 6-54252 discloses a technology that achieves an increase in the frame speed by exposing a succeeding frame at the image-capturing element while the image in the preceding frame is being compressed.

(2) In addition, Japanese Laid-Open Patent Publication No. H 7-135589 discloses a technology that achieves a higher frame speed by recording image data of an image that has been captured separately in a plurality of recording media to reduce the length of time required for image recording.

Now, higher resolution at the image-capturing element has become a vital requirement in an electronic camera in recent years to ensure that the captured image is of the highest possible quality. Higher resolution at the image-capturing element has caused the tendency of increases in the length of time required for reading the electrical charges from the image-capturing element (hereafter referred to as the "electrical charge read period").

The increase in the electrical charge read period has caused the length of time required for photographing a single frame to increase correspondingly, which presents a problem in that the frame speed of the electronic camera becomes lower. It is to be noted that since the prior art technologies for achieving higher speed (Japanese Laid-Open Patent Publication No. H6-54252, Japanese Laid-Open Patent Publication No. H7-135589) do not specifically deal with the longer electrical charge read period, it has not been possible to solve the problem of the lower frame speed occurring for the reason described above.

SUMMARY OF THE INVENTION

An object of the present invention is to provide an electronic camera with which the problem of lowered frame speed resulting from longer electrical charge read period can be alleviated. Another object of the present invention is to provide an electronic camera that is capable of maintaining accurate and correct operation timing even when a higher frame speed is achieved.

In order to attain the above objects, an electronic camera comprises: an image-capturing device that stores a signal electrical charge achieved by performing photoelectric conversion on a subject image projected on a photosensitive surface and reads out the signal electrical charge to generate an image signal; and a photographing preparation device that executes photographing preparations for photoelectric conversion performed at the image-capturing device. And, the photographic preparation device executes at least some of the photographing preparations for photographing a next frame during an electrical charge read period at the image-capturing device.

Preferably, this electronic camera further comprises: at least one of a shutter mechanism, a mirror mechanism, an aperture mechanism, a focal adjustment device and a photometric device. And the photographing preparations for the next frame include at least one of a shutter charge performed by the shutter mechanism, a mirror down performed by the mirror mechanism, a mirror up performed by the mirror mechanism, aperture control performed by the aperture mechanism, focal adjustment performed by the focal adjustment device and photometry performed by the photometric device, to enable photographing of the next frame.

Preferably, the electronic camera further comprises: a shutter mechanism, a mirror mechanism and an aperture mechanism. And the photographing preparation device completes a shutter charge performed by the shutter mechanism and a mirror down performed by the mirror mechanism to enable photographing of the next frame and starts a mirror up performed by the mirror mechanism and aperture control performed by the aperture mechanism to enable photographing of the next frame during an electrical charge read period at the image-capturing device.

Preferably, the electronic camera further comprises: a mirror mechanism, a focal adjustment device and a photometric device. And the photographing preparation device completes a mirror down performed by the mirror mechanism to enable photographing of the next frame and then implements focal adjustment by the focal adjustment device and photometry by the photometric device, during an electrical charge read period at the image-capturing device.

Preferably, the electronic camera further comprises: a continuous shooting command device that issues a command to perform continuous shooting. And, the photographic preparation device executes at least some of the photographing preparations for the next frame during the electrical charge read period at the image-capturing device while a command to perform continuous shooting issued by the continuous shooting command device is in effect.

Preferably, in the electronic camera, the photographing preparation device includes a drive motor that drives the photographing preparation and implements rotational drive of the drive motor during the electrical charge read period at the image-capturing device.

Preferably, in the electronic camera, the photographing preparation device includes a drive motor that sequentially drives a plurality of photographing preparations in correspondence to a rotating angle and implements rotational drive of the drive motor during the electrical charge read period at the image-capturing device.

Preferably, in the electronic camera, operation timing is set in advance at least at either the photographing preparation device or the image-capturing device to ensure that the electrical charge read period does not overlap a period over which a subject image of the next frame is projected onto the photosensitive surface.

Preferably, in the electronic camera, the photographing preparation device performs detection of a completion of a signal electrical charge read operation performed by the image-capturing device and following the detection, projects a subject image onto the photosensitive surface.

Preferably, the electronic camera further comprises: a time count device that measures at least a part of a length of time required for the photographing preparation. And at least either the photographing preparation device or the image-capturing device adjusts operation timing to ensure that a signal electrical charge read period does not overlap a period over which a subject image for the next frame is projected onto the photosensitive surface based upon results of count of the length of required time performed by the time count device.

DESCRIPTION OF THE PREFERRED EMBODIMENTS

The following is an explanation of the preferred embodiments of the present invention, given in reference to the drawings.

First Embodiment

Figure 1:
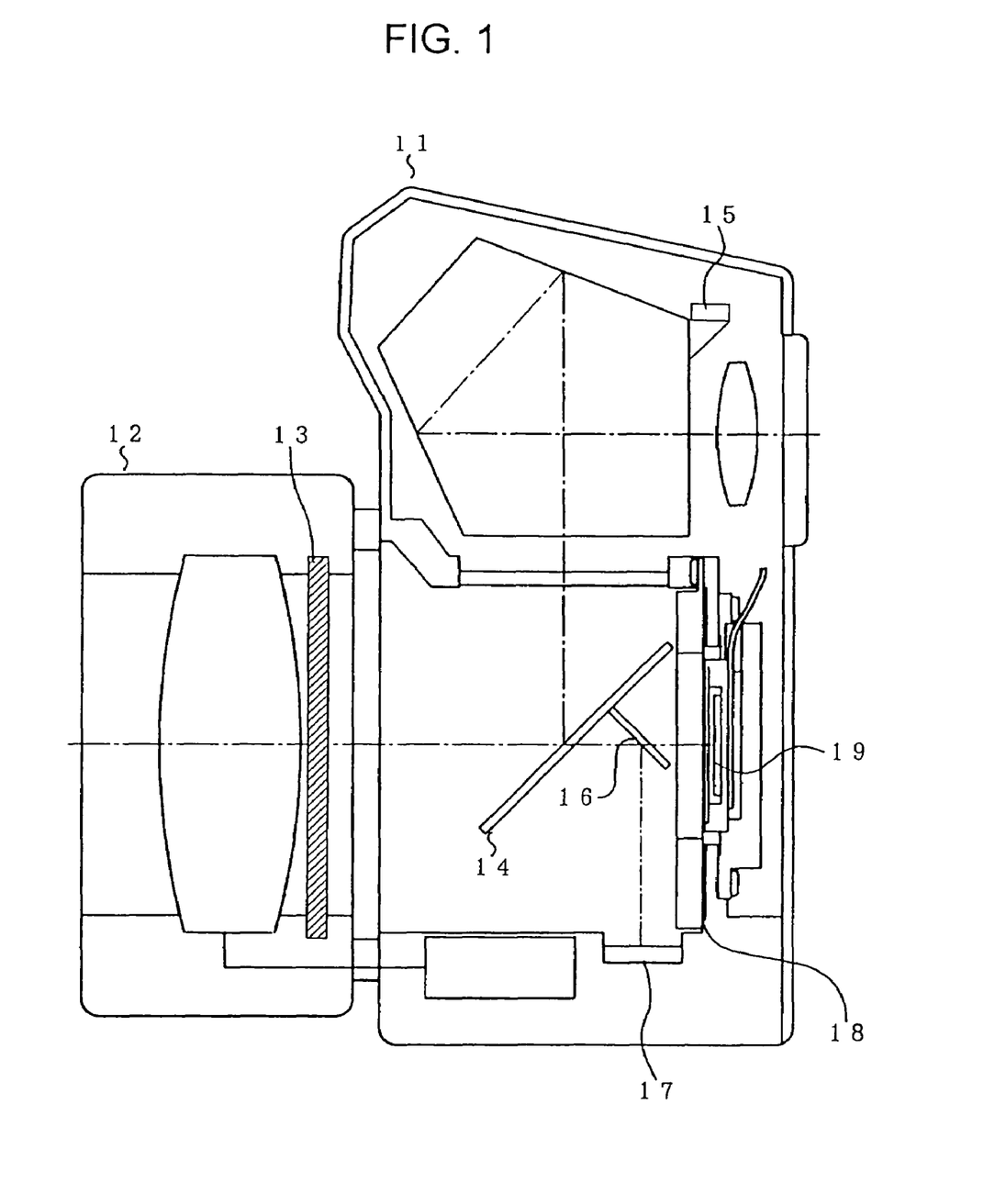
FIG. 1 illustrates the positional relationships in the internal structure of the electronic camera 11.

FIG. 1 illustrates the positioning of the main parts inside the camera in the first embodiment. In FIG. 1, a photographing optical system 12 is mounted at the body of an electronic camera 11. An aperture drive mechanism 13 and a quick-return mirror 14 are positioned in this order at the photographing optical system 12 toward the image space.

A viewfinder optical system is provided along the direction in which the quick-return mirror 14 reflects light. A photometric unit 15 that takes in subject light is provided at a portion of the viewfinder optical system. In addition, a sub-mirror 16 is provided at the rear surface of the quick-return mirror 14 in its central transmission area. A focal point detection unit 17 is provided along the direction in which the sub-mirror 16 reflects light. Also, an image-capturing element 19 is provided to the rear of the quick-return mirror 14 via a shutter mechanism 18 which is provided in between.

Figure 2:
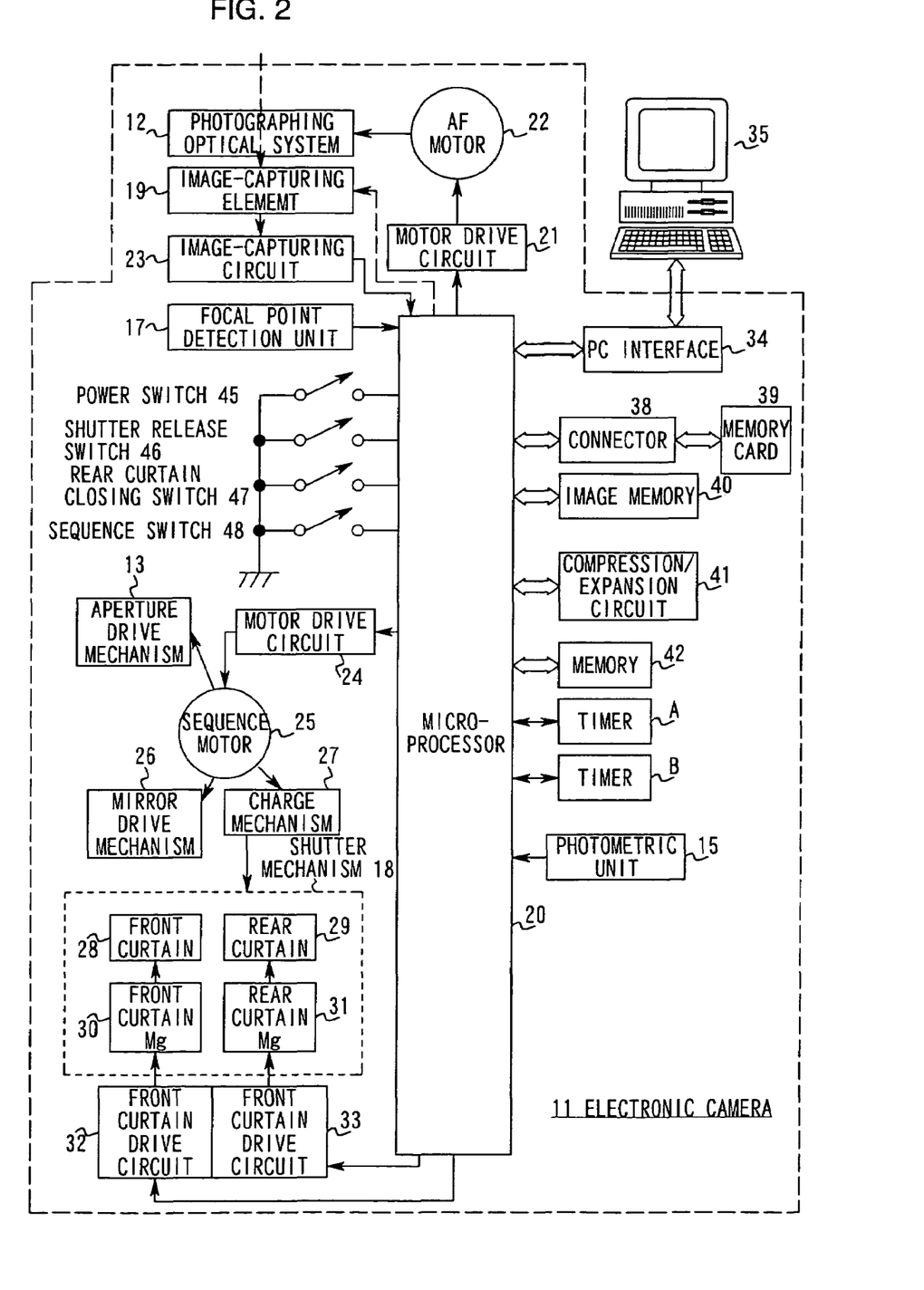
FIG. 2 is a block diagram illustrating the electrical system in the electronic camera 11.

FIG. 2 is a block diagram illustrating the electrical system in the electronic camera 11 described above. In FIG. 2, a microprocessor 20 that engages in the control of the entire system is provided inside the electronic camera 11. The microprocessor 20 controls an AF motor 22 via a motor drive circuit 21. The AF motor 22 drives the optical system back and forth for focus control provided inside the photographing optical system 12 and executes focal adjustment through the contrast method whereby the focal adjustment is assumed to be achieved when the contrast is at the highest.

In addition, the microprocessor 20 provides a drive pulse for electrical charge read to the image-capturing element 19 via a drive pulse generating circuit (not shown). An image signal output by the image-capturing element 19 is processed at an image-capturing circuit 23 which performs color signal processing and A/D conversion and then is input to the microprocessor 20 as image data. Furthermore, the microprocessor 20 implements control on a sequence motor 25 via a motor drive circuit 24. Depending upon the rotating angle of the sequence motor 25, the aperture drive mechanism 13, a mirror drive mechanism 26 and a charge mechanism 27 are driven in a specific order.

The mirror drive mechanism 26 raises and lowers the quick-return mirror 14. The charge mechanism 27 performs a sequence of operations, that is shutter charge, through which a front curtain 28 and a rear curtain 29 at the shutter mechanism 18 are reset to their pre-run positions and are mechanically retained. The front curtain 28 and the rear curtain 29 are respectively provided with a front curtain magnet 30 and a rear curtain magnet 31 that achieve curtain retention through magnetic force. The microprocessor 20 controls the electrical current supplied to the magnets 30 and 31 with a front curtain drive circuit 32 and a rear curtain drive circuit 33.

Furthermore, a PC interface 34 is provided inside the electronic camera 11. The microprocessor 20 exchanges data, instructions and the like with an external device 35 via the PC interface 34. In addition, two timers A and B for counting time are provided inside the electronic camera 11. By initializing the count values at the timers A and B, the microprocessor 20 can measure the lengths of time elapsed after the initialization.

Moreover, the microprocessor 20 obtains photometric data indicating the subject brightness via the photometric unit 15. By engaging in exposure calculation based upon the photometric data and the photosensitivity of the image-capturing element, the microprocessor 20 determines the correct aperture value. Also, a connector 38 is provided at the electronic camera 11. Image files and the like are transferred to and recorded in a memory card 39 by the microprocessor 20 via the connector 38.

In addition, an image memory 40 that is provided to temporarily record image data, a compression/expansion circuit 41 that compresses and expands the image data, a memory 42 that stores a control program and data, and the like are connected to the microprocessor 20. Also, a switch group that includes a power switch 45, a shutter release switch 46, a rear curtain closing switch 47 and a sequence switch 48, is connected to the microprocessor 20.

Operation of the First Embodiment

Figure 3:
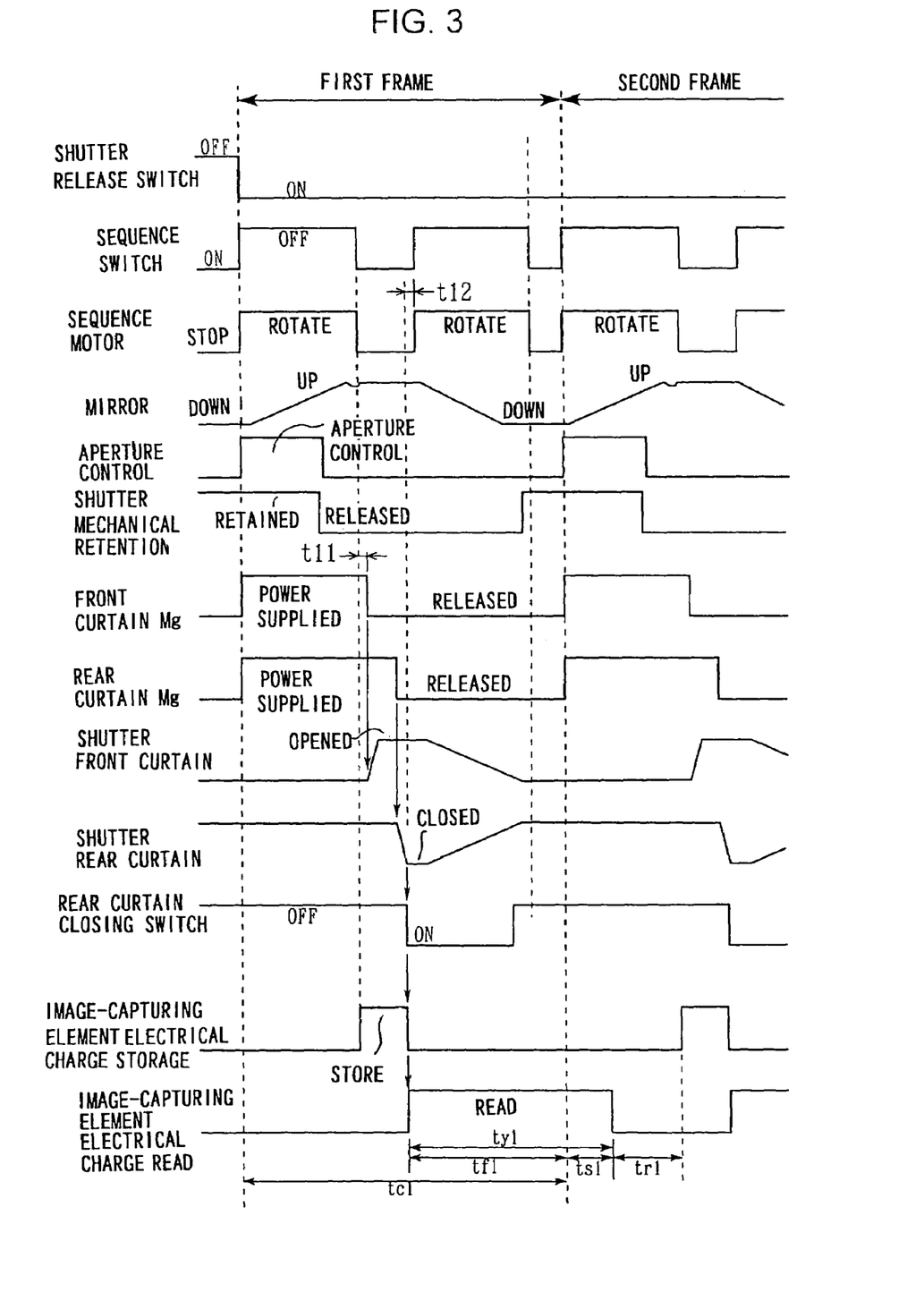
FIG. 3 is a timing chart of a first embodiment.
Figure 4:
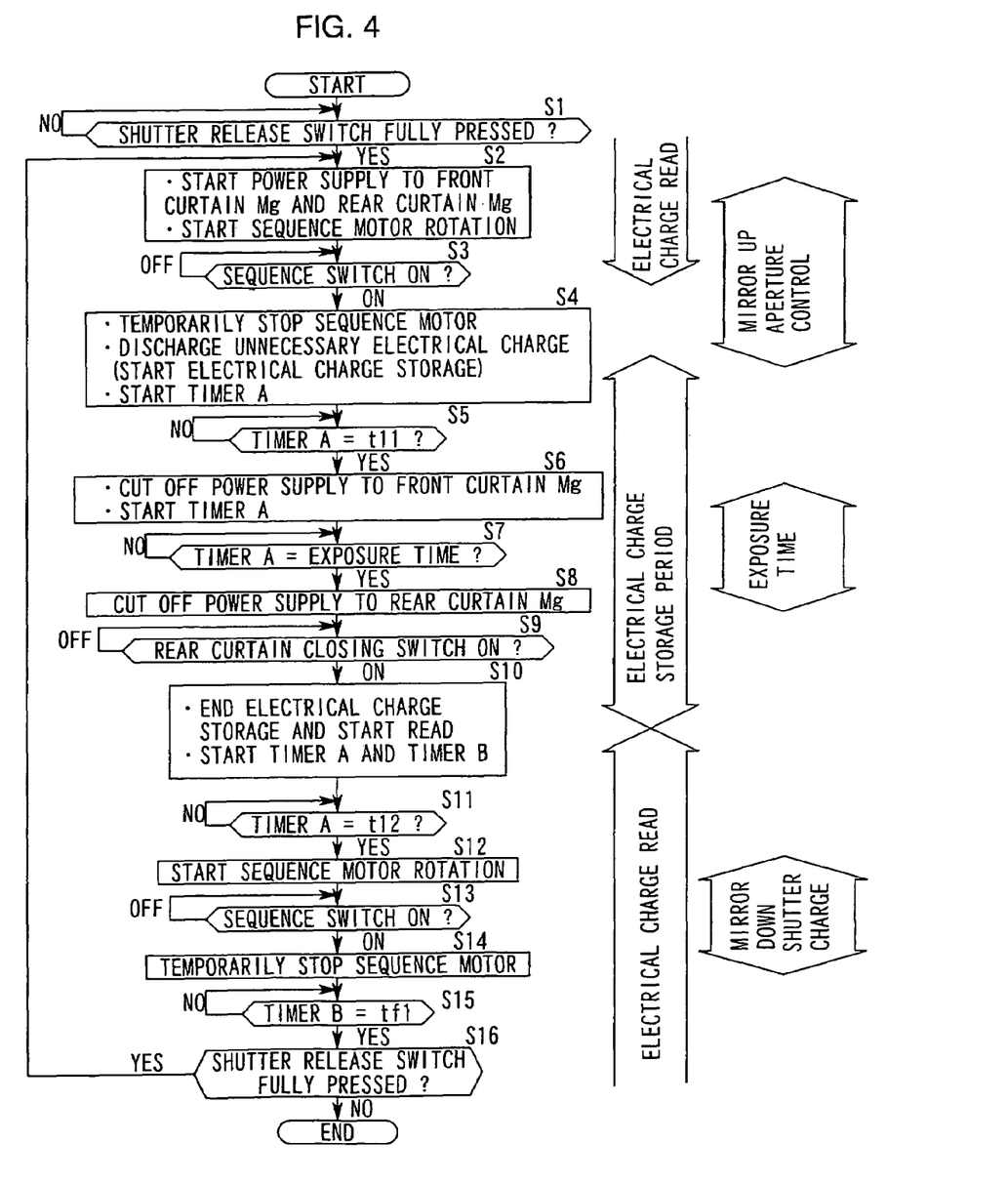
FIG. 4 is a flowchart of the operations performed by the microprocessor 20 in the first embodiment.

FIG. 3 is a timing chart of the first embodiment. In addition, FIG. 4 is a flowchart of the operations performed by the microprocessor 20. The following is an explanation of the operation achieved in the first embodiment given in reference to FIGS. 3 and 4.

First, a microprocessor 20 makes a decision as to whether or not the shutter release switch 46 is in a fully pressed state (FIG. 4, S1). It is to be noted that the shutter release switch 46 is a switch that may be pressed halfway down or fully down. Before the routine in FIG. 4 is started, automatic focal adjustment (AF) and photometry are performed while the shutter release switch 46 is pressed halfway down.

When the shutter release switch 46 is pressed fully down, the microprocessor 20 first starts power supply to the front curtain magnet 30 and the rear curtain magnet 31 and then starts rotation of the sequence motor 25 (FIG. 4, S2).

This rotation of the sequence motor 25 causes the mirror drive mechanism 26 to raise the quick-return mirror 14. In addition, the aperture drive mechanism 13 implements aperture control in correspondence to the correct aperture value. At the same time, the charge mechanism 27 releases the mechanical retention of the shutter mechanism 18.

When these operations effected by the sequence motor 25 are completed, the sequence switch 48 shifts to an ON state. After verifying that the sequence switch 48 is now in an ON state (FIG. 4, S3), the microprocessor 20 temporarily stops the sequence motor 25. At this point, the microprocessor 20 discharges any unnecessary electrical charge from the image-capturing element 19 to start an electrical charge storage period. At the same time, the microprocessor 20 initializes the count value at the timer A and starts time count (FIG. 4, S4).

In this state, the microprocessor 20 waits for a length of time t11 to elapse by monitoring the count value at the timer A (FIG. 4, S5). When the length of time t11 elapses, the microprocessor 20 decides that the rebounding of the quick-return mirror 14 has subsided to a sufficient degree and cuts off the power supply to the front curtain magnet 30. In response, the front curtain 28 starts its run due to the force applied to it and, as a result, the shutter mechanism 18 starts to open. At this point, the microprocessor 20 initializes the count value at the timer A to restart time count (FIG. 4, S6).

The microprocessor 20 waits for the exposure time to elapse by monitoring the count value at the timer A (FIG. 4, S7). When the exposure time elapses, the microprocessor 20 cuts off the power supply to the rear curtain magnet 31, as well (FIG. 4, S8). In response, the rear curtain 29 starts its run following the front curtain 28.

When the rear curtain 29 completes its run and the shutter mechanism 18 becomes completely closed, the rear curtain closing switch 47 switches to an ON state. When the microprocessor 20 verifies that the rear curtain closing switch 47 has shifted to an ON state (FIG. 4, S9), it supplies a drive pulse for electrical charge read to the image-capturing element 19 to start a read of the signal electrical charge. At this point, the microprocessor 20 initializes the count values at the timers A and B and starts time count (FIG. 4, S10).

In this state, the microprocessor 20 waits for a length of time t12 to elapse by monitoring the count value at the timer A (FIG. 4, S11). When the length of time t12 elapses, the microprocessor 20 restarts the rotation of the sequence motor 25 (FIG. 4, S12).

The "electrical charge read start" and the "restart of the rotation of the sequence motor 25" are shifted from each other by the length of time t12 in this manner. As a result, the source voltage is prevented from suddenly dropping and it becomes possible to reduce the noise interference between the two operations with great reliability.

As the sequence motor 25 restarts its rotation in this manner, the mirror drive mechanism 26 lowers the quick-return mirror 14. In addition, the charge mechanism 27 resets the front curtain 28 and the rear curtain 29 to their pre-run positions and mechanically retains them (shutter charge operation). In addition, in order to improve the degree of accuracy of the count in the photometric operation and the focal point detection operation, the aperture drive mechanism 13 may be temporarily reset to the open aperture in response to the restart of rotation of the sequence motor 25.

When these operations effected by the sequence motor 25 are completed, the sequence switch 48 shifts to an ON state. After verifying that the sequence switch 48 has shifted to an ON state (FIG. 4, S13), the microprocessor 20 temporarily stops the sequence motor 25 (FIG. 4, S14).

In this state, the microprocessor 20 waits for a length of time tf1 to elapse on the timer B (FIG. 4, S15). This length of time tf1 represents the length of wait time set by anticipating a margin (tr1 in FIG. 3) in advance in order to end the electrical charge read operation currently in progress before the exposure of the next frame starts with great reliability. It is to be noted that as explained later, it is mechanically assured that even when the control returns to step S2 to restart rotation of the sequence motor 25 and the like, the exposure of the next frame is not started for at least the length of time ts1. Consequently, a length of time that is shorter than the read period ty1 by the length of time ts1 can be set for the wait time tf1.

When the length of time tf1 elapses, the microprocessor 20 makes a decision as to whether or not the shutter release switch 46 is in a fully pressed state (FIG. 4, S16). At this point, if the fully pressed state has already been cleared, the microprocessor 20 ends the continuous shooting operation. If, on the other hand, the shutter release switch is still in the fully pressed state, the microprocessor 20 returns to the operation in step S2 to continue with the sequence of continuous shooting operations described above.

In the first embodiment, the descent of the quick-return mirror 13 and the shutter charge are completed during the electrical charge read period, and then the quick-return mirror 14 is raised and the aperture control is started.

Advantages of the First Embodiment

As explained above, in the first embodiment, the preparations for photographing the next frame (mirror down, shutter charge, mirror up, aperture control) are started during the electrical charge read period and the preparations for photographing the next frame (mirror down, shutter charge, mirror up, aperture control) are performed concurrently with the electrical charge read. By achieving such parallel operations, it is possible to reduce the length of time required for photographing a single frame in an effective manner and a higher frame speed can be achieved with great reliability and with ease.

In addition, since the shutter is mechanically closed by allowing the wait time tf1 to elapse during the operation, the subject image in the next frame is not projected onto the photosensitive surface during the electrical charge read period. Thus, the smear phenomenon resulting from the effect of the light at the photosensitive surface during the electrical charge read, i.e., during the electrical charge transfer, does not occur, so that the signal electrical charge can be read out with an even higher quality result.

In the case of the technologies for achieving higher speed in the prior art, it is difficult to achieve a higher frame speed if the electrical charge read period is lengthened as a result of assuring a higher resolution at the means for image-capturing. However, the first embodiment, in which the photographing preparations for the next frame are started in advance during the electrical charge read period and the preparations are made concurrently with the electrical charge, achieves a higher frame speed with great reliability.

Second Embodiment

Next, the second embodiment is explained. It is to be noted that since the structural features of the second embodiment are identical to those in the first embodiment except that the program operation at the microprocessor 20 is partially different, an explanation of the structural features is omitted here.

Figure 5:
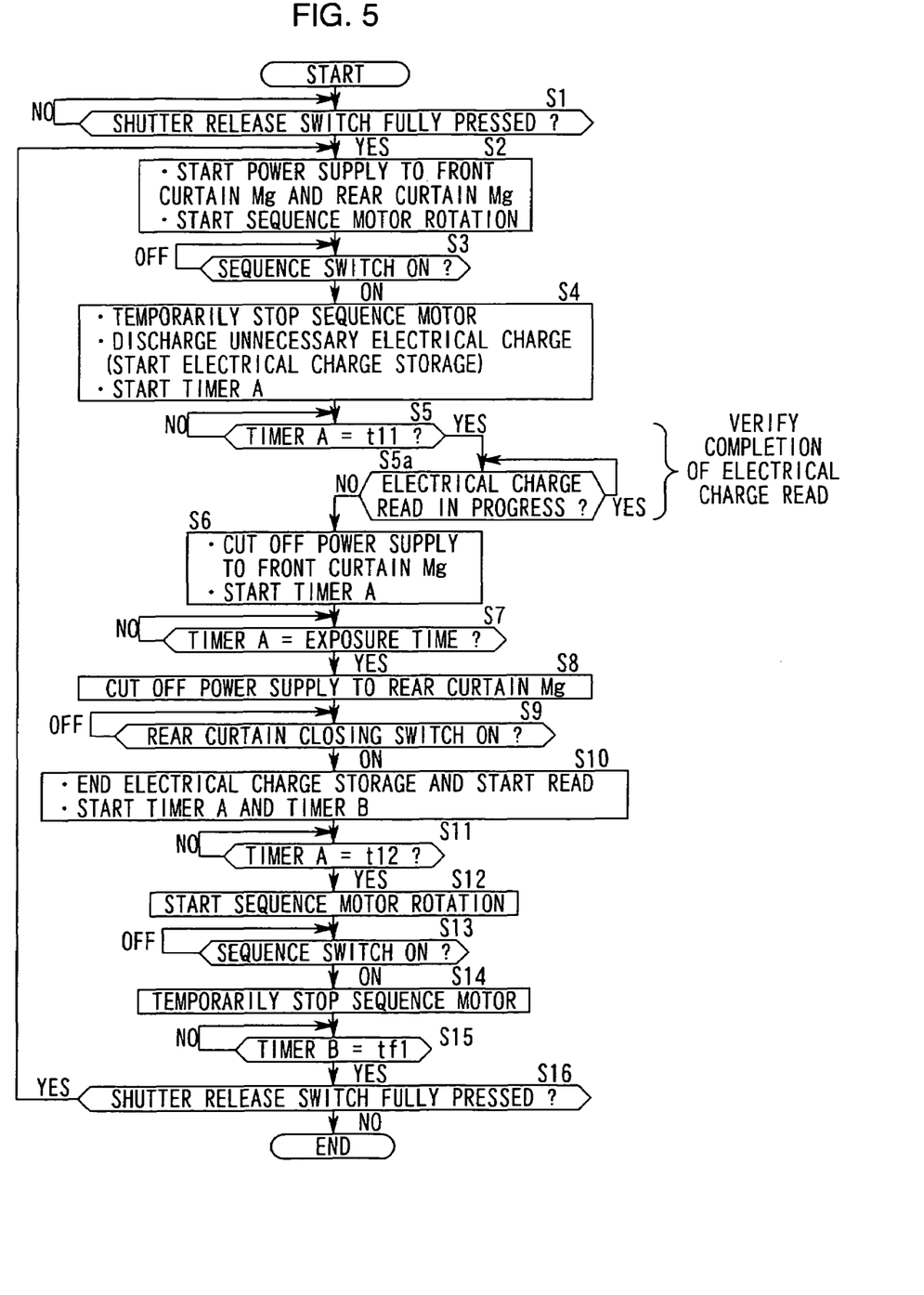
FIG. 5 is a flowchart of the operations performed by the microprocessor 20 in a second embodiment.

FIG. 5 is a flowchart of the operations performed by the microprocessor 20 in the second embodiment. The operation achieved in the second embodiment is characterized in that a front curtain run is started after verifying that the electrical charge read period has elapsed, as indicated in S5a in FIG. 5.

In the second embodiment, in which operational verification is performed in this manner, no problems such as the subject image in the next frame being projected onto the photosensitive surface during the electrical charge read period occur, even if the operation timing changes due to fluctuations in the source or the like. Furthermore, since it is not necessary to set a great length of time for the wait time tf1 in anticipation of fluctuations in the operation timing, the frame speed can be increased to the maximum possible.

Third Embodiment

Figure 6:
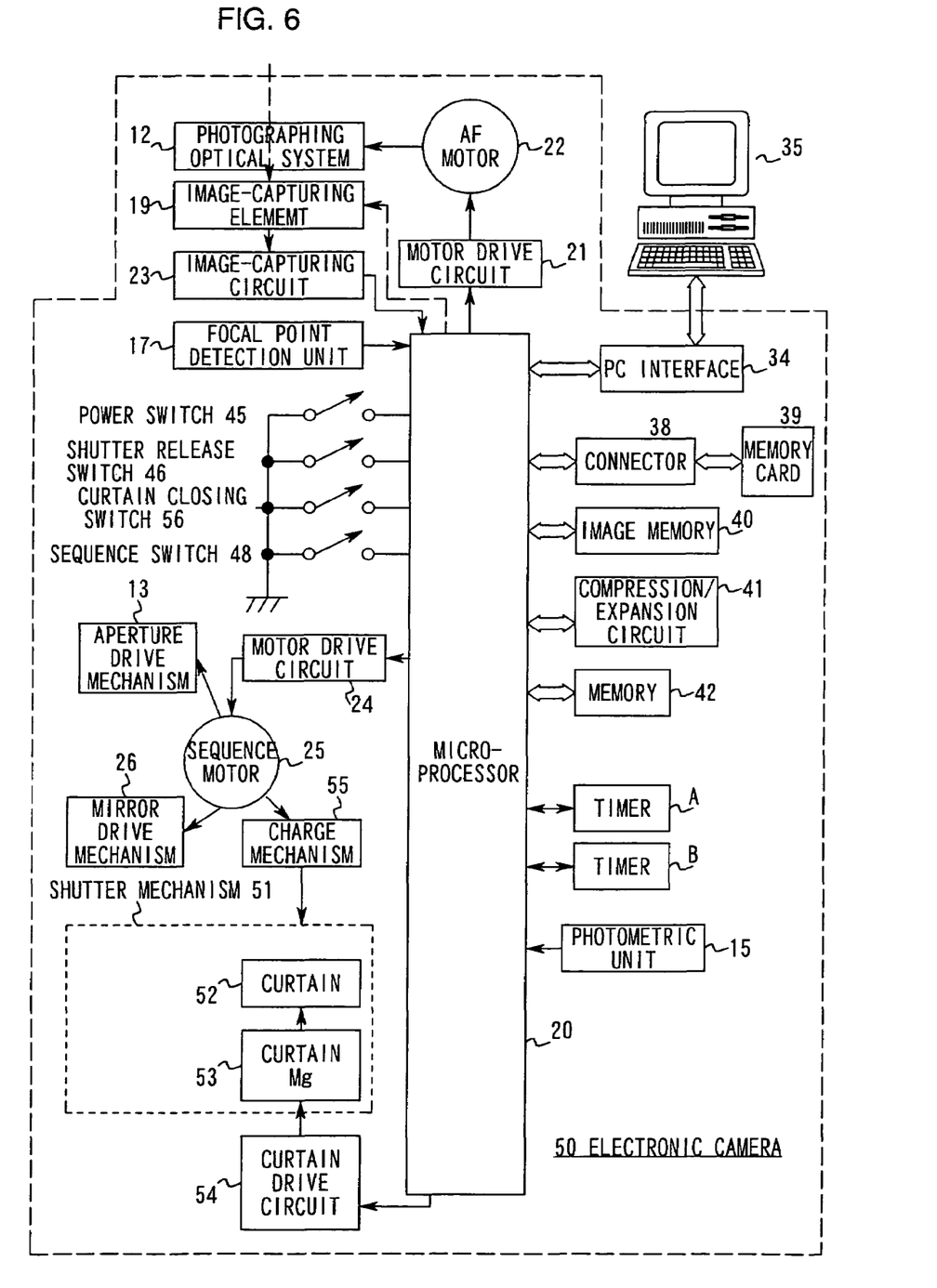
FIG. 6 is a block diagram illustrating the electrical system in the electronic camera 50 in a third embodiment.

Next, the third embodiment is explained. FIG. 6 is a block diagram illustrating the electrical system of an electronic camera 50 in the third embodiment. The structural features of the third embodiment are as described below.

A shutter mechanism 51 of the electronic camera 50 is provided with a single curtain 52. A curtain magnet 53 that retains the curtain 52 in an open state is controlled by the microprocessor 20 via a curtain drive circuit 54. In addition, a curtain closing switch 56 whose switch position state changes in correspondence to the open/closed state of the curtain 52. It is to be noted that since other structural features are identical to those in the first embodiment (FIG. 2), the same reference numbers are assigned to the relevant components in FIG. 6 to preclude the necessity for a repeated explanation thereof.

Figure 7:
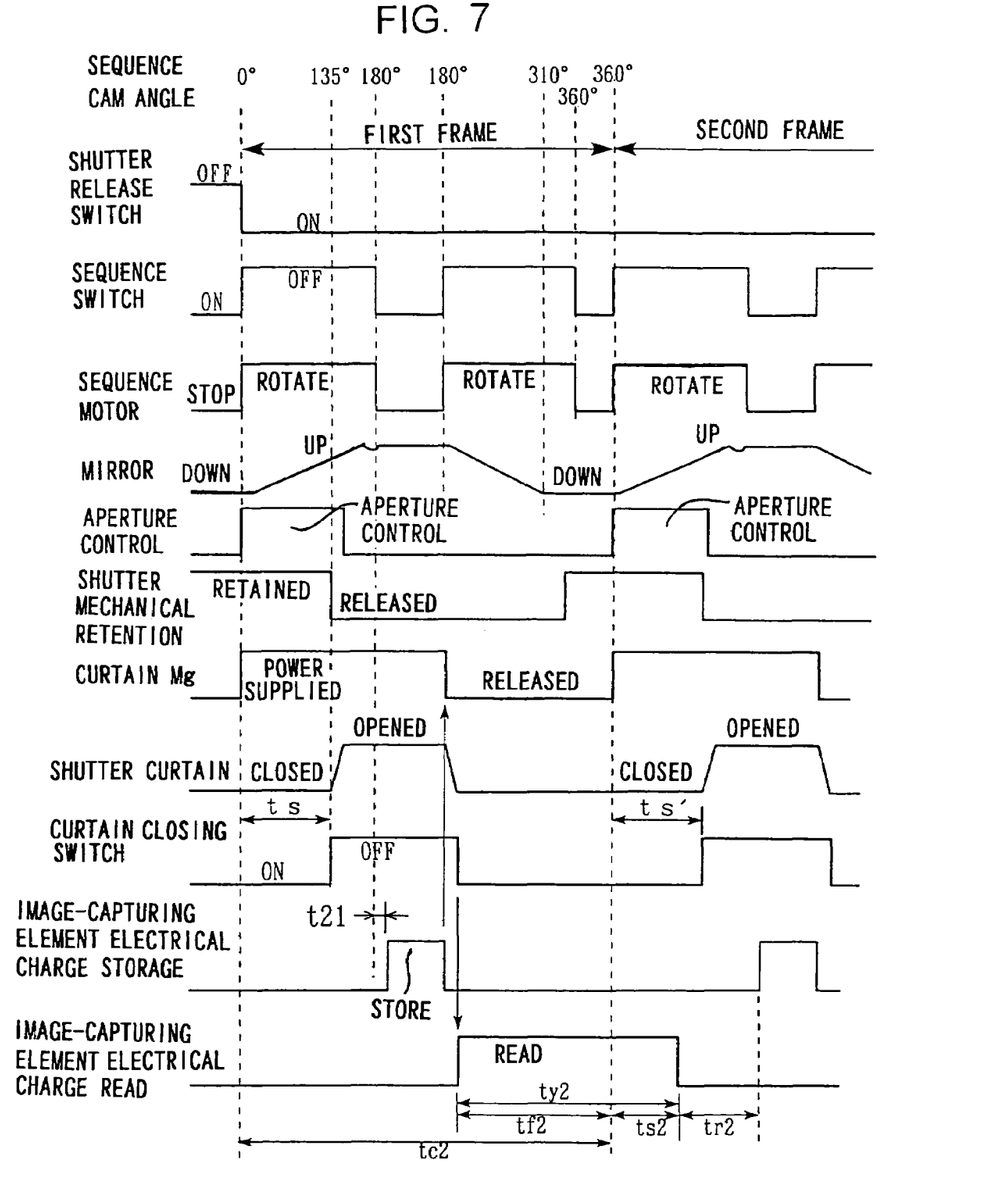
FIG. 7 is a timing chart of the third embodiment.
Figure 8:
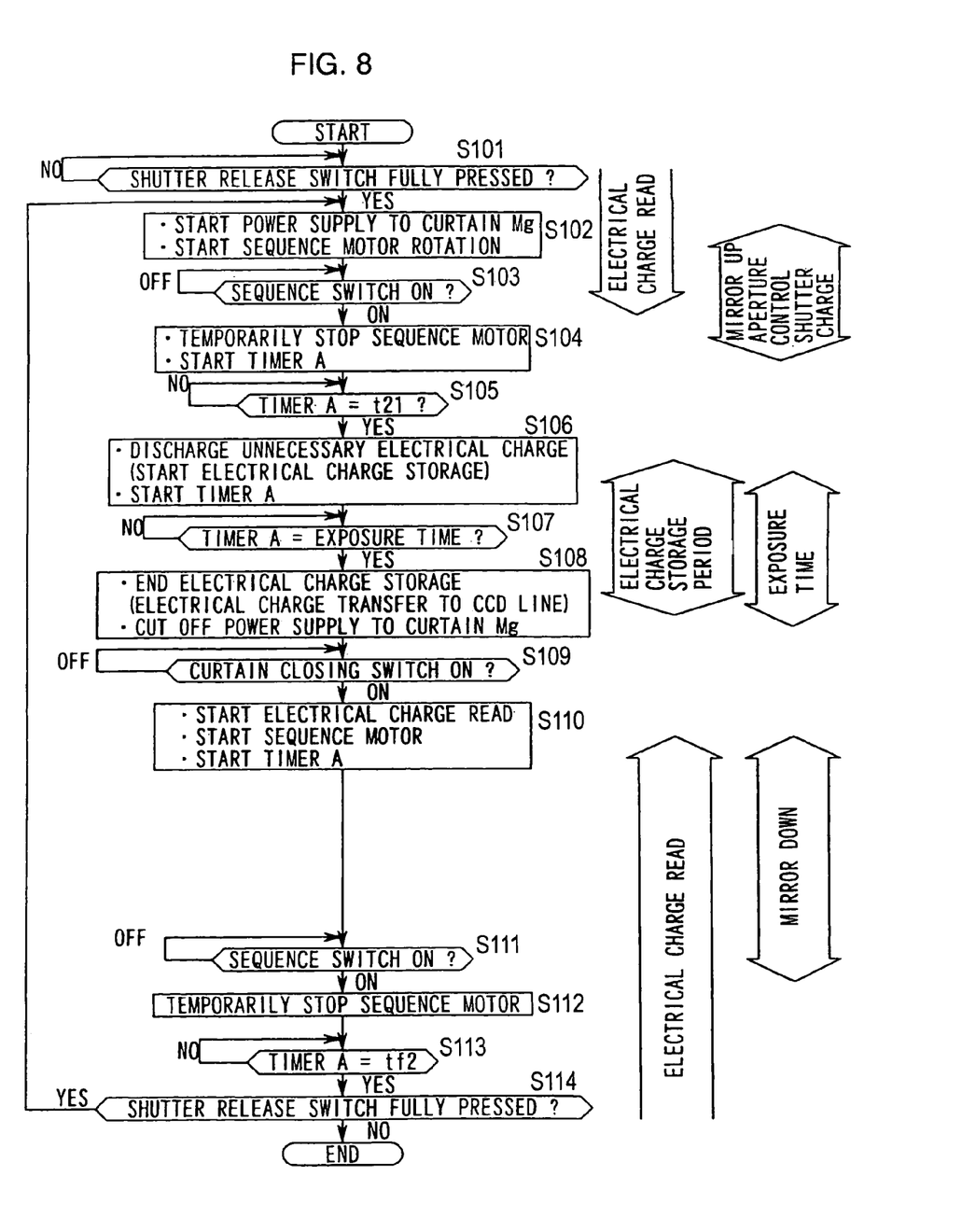
FIG. 8 is a flowchart of the operations performed by the microprocessor 20 in the third embodiment.

FIG. 7 is a timing chart of the third embodiment. In addition, FIG. 8 is a flowchart of the operations performed by the microprocessor 20. The following is an explanation of the operation achieved in the third embodiment, given in reference to FIGS. 7 and 8.

First, the microprocessor 20 makes a decision as to whether or not the shutter release switch 46 is in a fully pressed state (FIG. 8, S101). When the shutter release switch 46 is pressed fully down, the microprocessor 20 first starts power supply to the curtain magnet 53 and then starts rotation of the sequence motor 25 (FIG. 8, S102). It is to be noted that in this state, the curtain 52 sustains the closed state because of the mechanical retention effected by the charge mechanism 55.

This rotation of the sequence motor 25 causes the mirror drive mechanism 26 to raise the quick-return mirror 14. In addition, the aperture drive mechanism 13 implements aperture control in correspondence to the correct aperture value. At the same time, the charge mechanism 55 releases the mechanical retention of the shutter mechanism 51 to reset the curtain 52 in an open state (shutter charge operation). As a result, the curtain 52 is retained by the curtain magnet 53 to which power is being supplied and the shutter mechanism 51 is held in an open state.

When these operations effected by the sequence motor 25 are completed, the sequence switch 48 shifts to an ON state. After verifying that the sequence switch 48 is now in an ON state (FIG. 8, S103), the microprocessor 20 temporarily stops the sequence motor 25. At this point, the microprocessor 20 initializes the count value at the timer A and starts time count (FIG. 8, S104).

The microprocessor 20 waits for a length of time t21 to elapse by monitoring the count value at the timer A (FIG. 8, S105). When the length of time t21 elapses, the microprocessor 20 decides that the rebounding of the quick return mirror 14 has subsided to a sufficient degree and starts an electrical charge storage period by forcibly discharging any unnecessary electrical charge from the image capturing element 19. At this point, the microprocessor 20 initializes the count value at the timer A to restart time count (FIG. 8, S106).

The microprocessor 20 waits for the exposure time to elapse by monitoring the count value at the timer A (FIG. 8, S107). During this process, when the exposure time elapses, the microprocessor 20 ends the electrical charge storage period by transferring the signal electrical charges stored at the photosensitive surface in a batch onto the transfer line. In addition, the microprocessor 20 cuts off the power supply to the curtain magnet 53 to cause the curtain 52 to run in the closing direction by the force applied to it (FIG. 8, S108).

When the curtain 52 completes its run and the shutter mechanism 51 becomes completely closed, the curtain closing switch 56 switches to an ON state. When the microprocessor 20 verifies that the curtain closing switch 56 has shifted to an ON state (FIG. 8, S109), it supplies a drive pulse for electrical charge read to the image capturing element 19 to start a read of the signal electrical charge. In addition, the microprocessor 20 restarts the rotation of the sequence motor 25 at this point and then initializes the count value at the timer A to start time count (FIG. 8, S110).

As the sequence motor 25 restarts its rotation in this manner, the mirror drive mechanism 26 lowers the quick return mirror 14. It is to be noted that the aperture drive mechanism 13 may reset the aperture to an open state during this period. When these operations effected by the sequence motor 25 are completed, the sequence switch 48 shifts to an ON state. After verifying that the sequence switch 48 has shifted to an ON state (FIG. 8, S111), the microprocessor 20 temporarily stops the sequence motor 25 (FIG. 8, S112).

In this state, the microprocessor 20 waits for a length of time tf2 to elapse by monitoring the count value at the timer A (FIG. 8, S113). This length of time tf2 represents the length of wait time set in advance in order to end the electrical charge read operation currently in progress before the exposure of the next frame starts with great reliability.

When the length of time tf2 elapses, the microprocessor 20 makes a decision as to whether or not the shutter release switch 46 is in a fully pressed state (FIG. 8, S114). At this point, if the fully pressed state has already been cleared, the microprocessor 20 ends the continuous shooting operation. If, on the other hand, the shutter release switch is still in the fully pressed state, the microprocessor 20 returns to the operation in step S2 to sustain the continuous shooting operation.

Advantages of the Third Embodiment

As explained above, in the third embodiment, too, the preparations for photographing the next frame (mirror down, shutter charge, mirror up, aperture control) are performed during concurrently the electrical charge read period. Thus, it is possible to reduce the length of time required for photographing a single frame correspondingly and a higher frame speed can be achieved with great reliability and with ease.

In addition, since the wait time tf2 is allowed to elapse during the operation, the subject image in the next frame is not projected onto the photosensitive surface during the electrical charge read period. Thus, the smear phenomenon resulting from the effect of the light at the photosensitive surface during the electrical charge read, i.e., during the electrical charge transfer, does not occur, so that the signal electrical charge can be read out with even higher quality results.

Furthermore, in the third embodiment, the shutter mechanism 51 is constituted of a single curtain to partially incorporate the electronic shutter operation. Thus, it is possible to do without the length of time required for opening and closing the front curtain 28 in the first embodiment to achieve a corresponding reduction in the length of time required to photograph a single frame. Consequently, an even higher frame speed is achieved.

Fourth Embodiment

Next, the fourth embodiment is explained. It is to be noted that since the structure and the timing chart of the fourth embodiment are identical to those of the third embodiment (FIGS. 6 and 7), their explanation is omitted here.

Figure 9:
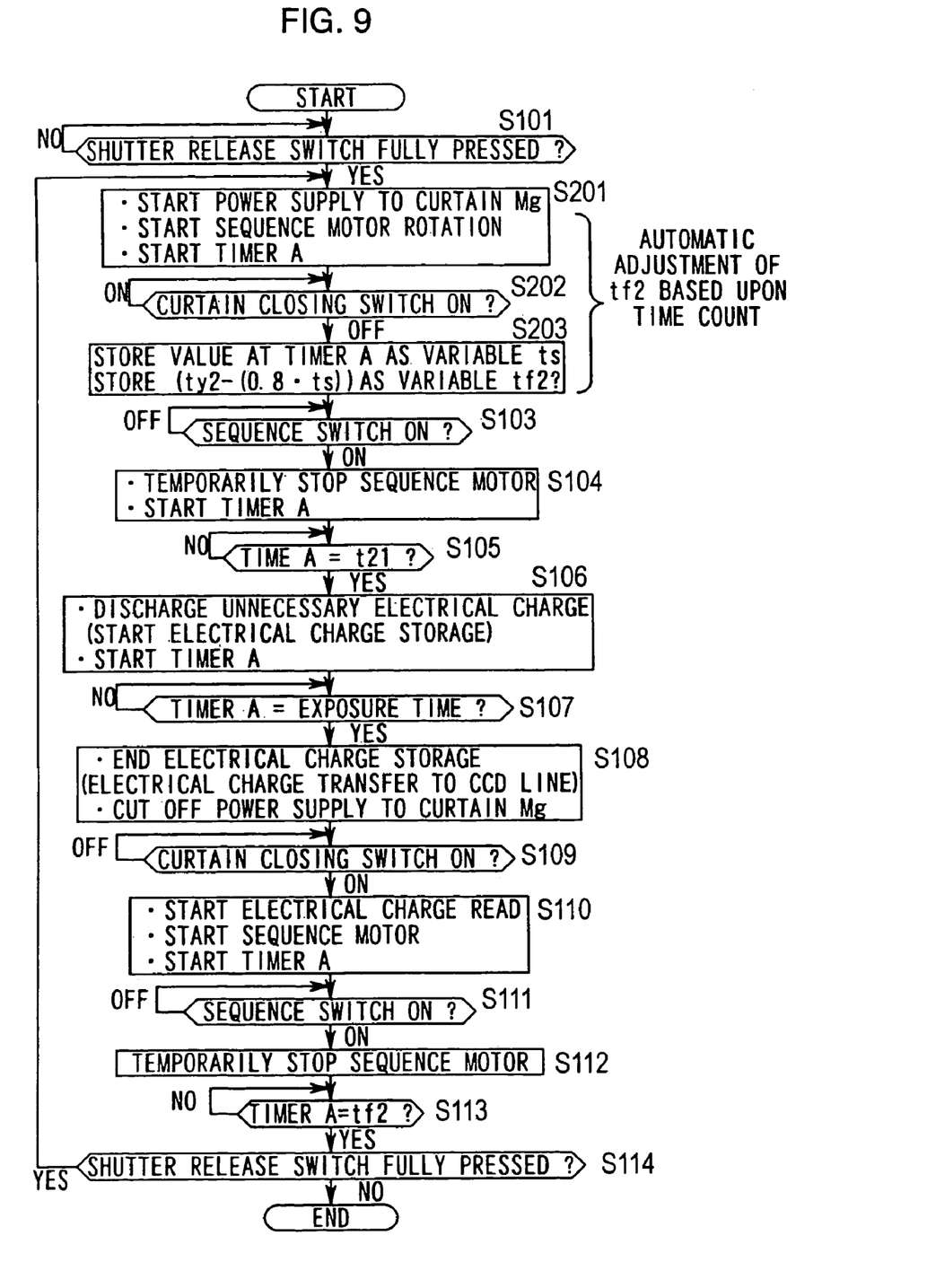
FIG. 9 is a flowchart of the operations performed by the microprocessor 20 in a fourth embodiment.

FIG. 9 is a flowchart of the operations performed by the microprocessor 20 in the fourth embodiment. The operation achieved in the fourth embodiment is characterized as follows.

(1) As indicated in FIG. 9, S201, the microprocessor 20 starts the timer A at the point in time at which the rotation of the sequence motor 25 starts.

(2) In this state, the microprocessor 20 monitors the switching state of the curtain closing switch (FIG. 9, S202).

(3) The microprocessor 20 stores the count value at the timer A as a variable is when the curtain closing switch 56 shifts to an OFF state. This length of time is represents the length of time elapsing between the start of rotation of the sequence motor 25 and the completion of the shutter charge operation performed by the charge mechanism 55. Based upon the length of time ts, tf2=ty2−(0.8·ts) is calculated to determine the wait time tf2 (FIG. 9, S203).

It is to be noted that ty2 in the formula above represents the length of time required for the signal electrical charge read, which is uniquely determined by the resolution at the image capturing element 19 and the frequency of the drive pulse. In addition, "0.8" in the formula above is a coefficient set to assure the safety of the operation timing and is a value slightly smaller than 1.

(4) In conformance to the wait time tf2 thus determined, the timing with which the rotation of the sequence motor 25 is started for the next frame is determined (FIG. 9, S113).

Thus, in the fourth embodiment, the operation timing is automatically adjusted based upon the time count performed in the photographing preparations. Consequently, even when the operation timing gradually changes due to fluctuations in the battery voltage and the like, problems such as the subject image in the next frame becoming projected onto the photosensitive surface during the electrical charge read period do not occur.

In addition, since it is not necessary to set the wait time tf2 with a margin in correspondence to the fluctuations of the operation timing, the frame speed can be increased to the maximum degree.

It is to be noted that while shutter charge, mirror down, mirror up and aperture control are started during the electrical charge read period as preparations for photographing in the embodiments explained above, the present invention is not limited to this example.

Figure 10:
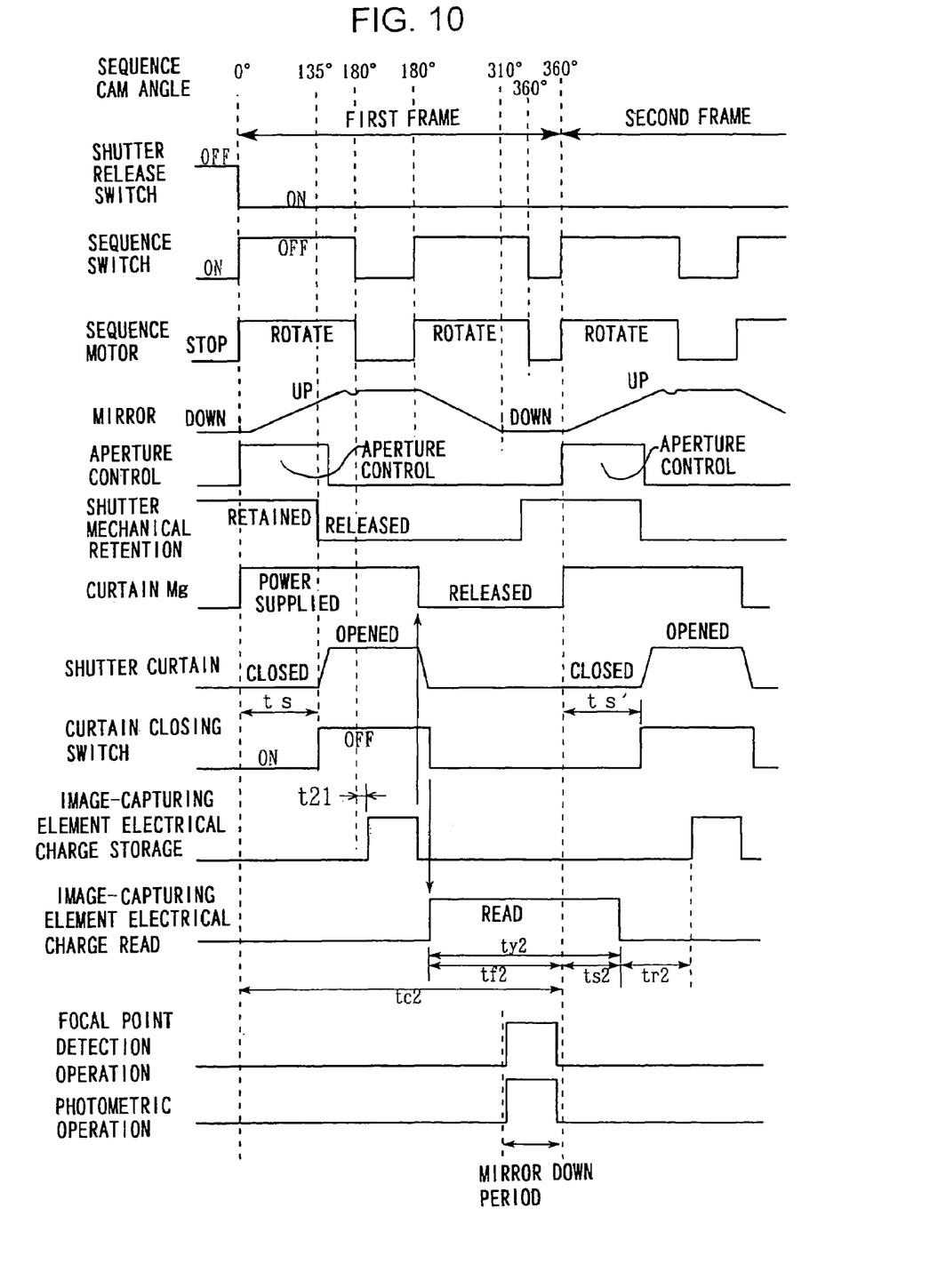
FIG. 10 is a timing chart of the focal point detection operation and the photometric operation started during the electrical charge read period.

For instance, as illustrated in FIG. 10, photographing preparations such as the focal point detection operation and the photometric operation may be started concurrently during the electrical charge read period.

It is to be noted that in this example, the focal point detection operation and the photometric operation are executed while the mirror is down, since the camera structure in which the subject light is guided to the focal point detection unit and the photometric unit while the mirror is down, as in the electronic camera 11 in FIG. 1, is the prerequisite in the example. However, in an electronic camera that is free of such limitation, the focal point detection operation and photometric operation may be started regardless of the state of the mirror to achieve an even higher frame speed.

In addition, while an operation that is performed when the continuous shooting mode is set has been explained in reference to the embodiments above, the present invention is not limited to this example. For instance, the photographing preparations for the next frame may be started during an electrical charge read period in a single-shot mode. Through such an operation, it becomes possible to reduce the length of time required to elapse before the next frame can be photographed even in the single-shot mode. It is to be noted that in this case, the length of the time interval elapsing before the shutter release for the next frame may be measured so that the photographing preparations for the next frame can be performed again if this time interval exceeds a specific length of time. By implementing such an operation, it becomes possible to achieve an optimal balance between higher frame speed and correct photographing preparations for the next frame in the single-shot mode.

The explanation has been given in reference to the embodiments on single lens reflex type electronic camera such as the electronic camera 11 illustrated in FIG. 1 having a quick-return mirror, a shutter mechanism and the like. However, the details of the electronic camera do not need to be limited to these particulars. The particulars of the present invention may be adopted in an electronic camera that is not provided with a quick-return mirror, a shutter mechanism and the like. In other words, the present invention may be adopted in the entire range of electronic cameras that require specific photographing preparations to enable photographing of the next frame.

What is claimed is:

1. An electronic camera, comprising:
   an image-capturing device that stores a signal electrical charge achieved by performing photoelectric conversion on a subject image projected on a photosensitive surface and reads out the signal electrical charge to generate an image signal;
   a photographing preparation device that executes photographing preparations including a mechanical operation for photoelectric conversion performed at the image-capturing device;
   a mirror mechanism;
   a shutter mechanism; and
   an aperture mechanism, wherein
   the photographing preparations include a mirror down performed by the mirror mechanism;
   the photographic preparation device executes at least the mirror down performed by the mirror mechanism for photographing a next frame during an electrical charge read period at the image-capturing device; and
   the photographing preparation device completes a shutter charge performed by the shutter mechanism and the mirror down performed by the mirror mechanism to enable photographing of the next frame and starts a mirror up performed by the mirror mechanism and aperture control performed by the aperture mechanism to enable photographing of the next frame during an electrical charge read period at the image capturing device.

2. An electronic camera according to claim 1, further comprising:
   a continuous shooting command device that issues a command to perform continuous shooting, wherein
   the photographic preparation device executes at least the mirror down performed by the mirror mechanism for the next frame during the electrical charge read period at the image-capturing device while a command to perform continuous shooting issued by the continuous shooting command device is in effect.

3. An electronic camera according to claim 1, wherein
   the photographing preparation device includes a drive motor that drives the photographing preparation and implements rotational drive of the drive motor during the electrical charge read period at the image-capturing device.

4. An electronic camera according to claim 1, wherein
   the photographing preparation device includes a drive motor that sequentially drives a plurality of photographing preparations in correspondence to a rotating angle and implements rotational drive of the drive motor during the electrical charge read period at the image capturing device.

5. An electronic camera according to claim 1, wherein
   operation timing is set in advance at least at either the photographing preparation device or the image-capturing device to ensure that the electrical charge read period does not overlap a period over which a subject image of the next frame is projected onto the photosensitive surface.

6. An electronic camera, according to claim 1, wherein:
   the photographing preparation device performs detection of a completion of a signal electrical charge read operation performed by the image-capturing device and following the detection, projects a subject image onto the photosensitive surface.

7. An electronic camera, comprising:
   an image-capturing device that stores a signal electrical charge achieved by performing photoelectric conversion on a subject image projected on a photosensitive surface and reads out the signal electrical charge to generate an image signal;
   a photographing preparation device that executes photographing preparations including a mechanical operation for photoelectric conversion performed at the image-capturing device;
   a mirror mechanism;
   a focal adjustment device; and
   a photometric device, wherein
   the photographing preparations include a mirror down performed by the mirror mechanism;
   the photographic preparation device executes at least the mirror down performed by the mirror mechanism for photographing a next frame during an electrical charge read period at the image-capturing device; and
   the photographing preparation device completes the mirror down performed by the mirror mechanism to enable photographing of the next frame and then implements focal adjustment by the focal adjustment device and photometry by the photometric device, during an electrical charge read period at the image capturing device.

8. An electronic camera according to claim 7, further comprising:
   a continuous shooting command device that issues a command to perform continuous shooting, wherein
   the photographic preparation device executes at least the mirror down performed by the mirror mechanism for the next frame during the electrical charge read period at the image-capturing device while a command to perform continuous shooting issued by the continuous shooting command device is in effect.

9. An electronic camera according to claim 7, wherein the photographing preparation device includes a drive motor that drives the photographing preparation and implements rotational drive of the drive motor during the electrical charge read period at the image-capturing device.

10. An electronic camera according to claim 7, wherein the photographing preparation device includes a drive motor that sequentially drives a plurality of photographing preparations in correspondence to a rotating angle and implements rotational drive of the drive motor during the electrical charge read period at the image-capturing device.

11. An electronic camera according to claim 7, wherein operation timing is set in advance at least at either the photographing preparation device or the image-capturing device to ensure that the electrical charge read period does not overlap a period over which a subject image of the next frame is projected onto the photosensitive surface.

12. An electronic camera according to claim 7, wherein: the photographing preparation device performs detection of a completion of a signal electrical charge read operation performed by the image-capturing device and following the detection, projects a subject image onto the photosensitive surface.

13. An electronic camera, comprising:
an image-capturing device that stores a signal electrical charge achieved by performing photoelectric conversion on a subject image projected on a photosensitive surface and reads out the signal electrical charge to generate an image signal;
a photographing preparation device that executes photographing preparations for photoelectric conversion performed at the image-capturing device, wherein
the photographic preparation device executes at least some of the photographing preparations for photographing a next frame during an electrical charge read period at the image-capturing device; and
a time count device that measures at least a part of a length of time required for the photographing preparation, wherein
at least either the photographing preparation device or the image-capturing device adjusts operation timing to ensure that a signal electrical charge read period does not overlap a period over which a subject image for the next frame is projected onto the photosensitive surface based upon results of count of the length of required time performed by the time count device.

14. An electronic camera, comprising:
a shutter mechanism that turns a shutter to an opened state or a closed state; and
a mirror mechanism that performs a mirror up operation and a mirror down operation;
an image-capturing device that stores an electrical charge achieved by performing photoelectric conversion on a subject image projected on a photosensitive surface within a period when the shutter is in the opened state and reads out the electrical charge to generate an image signal after the shutter is turned to the closed state;
a photographing preparation device that executes photographing preparations including the mirror down operation performed by the mirror mechanism for photographing a next frame, wherein
the photographic preparation device executes the mirror down operation performed by the mirror mechanism in parallel with reading out of the electrical charge stored within a just previous period when the shutter was in the opened state.

15. An electronic camera according to claim 14, further comprising:
at least one of an aperture mechanism and a focal adjustment device, wherein
the photographing preparations for the next frame further include at least one of a shutter charge performed by the shutter mechanism, the mirror up operation performed by the mirror mechanism, aperture control performed by the aperture mechanism, and focal adjustment performed by the focal adjustment device, to enable photographing of the next frame.

16. An electronic camera according to claim 14, wherein the photographic preparation device starts the mirror down operation after the reading out of the electrical charge starts, and then executes the mirror down operation in parallel with reading out of the electrical charge.

17. An electronic camera according to claim 14, wherein the photographic preparation device starts the mirror down operation before the reading out of the electrical charge starts, and then executes the mirror down operation in parallel with reading out of the electrical charge.

* * * * *